United States Patent
Matsuura et al.

(10) Patent No.: US 6,891,949 B2
(45) Date of Patent: May 10, 2005

(54) DIRECT CURRENT VIBRATION MOTOR AND ARMATURE STRUCTURE

(75) Inventors: Katsuhisa Matsuura, Yotsukaido (JP); Moritaka Goto, Chiba (JP); Minoru Makiyo, Yachimata (JP); Yoshitomo Uno, Kuroishi (JP); Takashi Susukida, Yotsukaido (JP); Toshiyuki Ogawa, Chiba-ken (JP)

(73) Assignee: Fujikura Ltd., Tokyo (JP)

( * ) Notice: Subject to any disclaimer, the term of this patent is extended or adjusted under 35 U.S.C. 154(b) by 412 days.

(21) Appl. No.: 09/773,693

(22) Filed: Feb. 2, 2001

(65) Prior Publication Data

US 2004/0202313 A1 Oct. 14, 2004

(30) Foreign Application Priority Data

Feb. 4, 2000 (JP) .......................................  2000-027595

(51) Int. Cl.[7] .............................................. H04M 1/00
(52) U.S. Cl. .................................................. 379/433.01
(58) Field of Search ............................ 379/433.01, 418, 379/433.02; 455/90.3, 575.1; 310/81, 128, 237

(56) References Cited

FOREIGN PATENT DOCUMENTS

| JP | 4-355642 | 12/1992 | | |
|---|---|---|---|---|
| JP | 6-205565 | 7/1994 | .......... | H02K/7/075 |
| JP | 9-327150 | 12/1997 | .......... | H02K/7/075 |
| JP | 10-174361 | 6/1998 | .......... | H02K/7/075 |
| JP | 10-336983 | 12/1998 | .......... | H02K/23/58 |

OTHER PUBLICATIONS

Patent Abstract of Japan 06205565 A, Jul. 22, 1994.
Patent Abstract of Japan 10336983 A, Dec. 18, 1998.
Patent Abstract of Japan 09327150 A, Dec. 16, 1997.
Patent Abstract of Japan 10174361 A, Jun. 26, 1998.

*Primary Examiner*—Jack Chiang
(74) *Attorney, Agent, or Firm*—Sughrue Mion, PLLC

(57) ABSTRACT

The direct current vibration motor comprises a stator, a rotor rotatably attached on this stator, and a cylindrical cover for sealing the rotor. The stator has four permanent magnets arranged in a ring-like configuration and magnetized in an axial direction. The rotor is provided with an armature eccentrically fixed to a portion in the circumferential direction of the rotation shaft. The armature comprises a first coil and a second coil. Furthermore, the armature is provided with a pin formed of a magnetic body for regulating the static position so that the first coil and the second coil are fixed at a position where the first coil and the second coil are deviated from the central position of the magnetic pole of the stator. Current is supplied to the coils with the commutator and the brushes arranged with the spatial phase angle of 90°.

19 Claims, 12 Drawing Sheets

DIRECT CURRENT VIBRATION MOTOR AND ARMATURE STRUCTURE

CROSS-REFERENCE TO RELATED APPLICATIONS

This application is based upon and claims the benefit of priority from the prior Japanese Patent Application No. 2000-027595, filed Feb. 4, 2000, the entire contents of which are incorporated herein by reference.

BACKGROUND OF THE INVENTION

The present invention is applied to a direct current vibration motor used in an incoming call vibration-generating device for a mobile telephone or the like. More particularly, the present invention relates to a direct current vibration motor suitable for a size reduction and an armature structure thereof.

As a flat-type direct current vibration motor used in a small-size wireless telephone paging device and a mobile telephone, for example, as shown in FIG. 15, there is known a motor in which a rotor has an eccentric structure (Jpn. Pat. Appln. KOKAI Publication No. 6-205565). This vibration motor comprises a stator 102 comprising four permanent magnets 101 arranged in a ring-like configuration and magnetized in an axial direction, and a rotor 104 provided with an armature 103 located opposite to the permanent magnets 101 of the stator 102, wherein the armature 103 of the rotor 104 is constituted in such a manner that the whole armature 103 of the rotor 104 is formed in a fan-like configuration by allowing three coils 105 to which current is supplied to be located adjacent to each other in a circumferential direction with the result that the rotor 104 is formed in an eccentric structure.

When current is supplied to these threes coils 105 via a commutator 106, the rotation direction of the rotor 104 is determined by the Fleming's left hand law with the direction of the current and the direction of the magnetic force from the permanent magnets 101. Current flowing via the commutator 106 is simultaneously supplied to two or more coils 105. At least two coils 105 out of the three coils 105 exceed the other coil 105 so that the restart-up thereof is enabled irrespective of the suspension position of the rotor 104.

A vibration is generated with an eccentric load by the rotation of the rotor 104 by arranging the three coils 105 at an eccentric position deviated to one side of the rotor 104 in this manner. With such three coil motors, even when the direction of the current flowing through the two coils are different, the start-up direction thereof can be made equal by arranging the three coils so that the direction of the magnetic force corresponding to these coils becomes different. As a consequence, the motor can be started up irrespective of the suspension position of the rotor 104.

By the way, along with the prevalence of mobile telephones, a direct current motor smaller in size than the conventional type is desired so that the incoming vibration of the mobile telephones on trains or the like can be felt through a wrist watch or the like worn at all times by men instead of the main body of the mobile telephones. However, with the conventional flat-type direct current vibration motor described above, the rotors are concentrated at one location in a circumferential direction, but three phases coils are arranged in parallel in the circumferential direction so that the rotors inevitably become large in the circumferential direction to some extent and no large eccentric effect can be obtained with the result that the strength of vibration felt by men is limited. Consequently, when an attempt is made to reduce the size of the external diameter of the vibration motor of this type so far commercially sold on the market, there arises a problem in that the function of vibration motor cannot be sufficiently attained.

Therefore, in order to obtain a higher eccentric effect with the small-size motor, there is proposed an eccentric direct current vibration motor in which the armature 202 of the rotor 201 is constituted of one or two coils 203, for example, as shown in FIG. 16 (Jpn. Pat. Appln. KOKAI Publication No. 10-336983). In this motor, the commutator 203 is divided into four in the circumferential direction so that the divided bodies of the commutator located opposite to each other are commonly connected. At the same time, both the start end and the terminal end of the coil are connected to the adjacent divided bodies of the commutator respectively to supply the current to the divided bodies of the commutator via a brush arranged through 90°. When the rotor 201 is rotated, the direction of the current flowing through the coil 203 for each of the rotation angle is reversed, the rotation of the rotor 201 is sustained with the absorption and the repulsion action of the N/S poles of the permanent magnet 101 and the magnetic force of the coil 203.

However, one coil type motor is constituted in a mechanism in which the adjacent divided bodies of the commutator are instantly short circuited with the brush in that the direction of the current flowing through the coil 203 is changed over. In this case, the short circuit of the power source is generated. Consequently, there is provided a non-electrification dead point in which the brush is not connected to any of the commutator so that such short circuit of the power source is not generated. By the way, in the case where the rotor 201 is suspended with this dead point, current does not flow through the coil 203 at the next time of rotation so that the start-up is disabled.

Therefore, in order to secure the start-up by preventing the suspension of the rotor at this dead point, an iron pin 205 formed of a magnetic body is provided which regulates the static position at one part of the armature 202.

However, even when an attempt is made to regulate the start-up position with the iron pin, the presence of the iron pin itself constitutes a rotation load. In addition, when a contact friction resistance between the brush and the commutator exceeds a return force to a normal static position with a magnetic force between the iron pin and a permanent magnet with an increase in the contact friction resistance with the lapse of time, the rotor is suspended at the dead point in the end. Furthermore, when the iron pin is arranged so that a magnetic force sufficiently larger than the friction force can be obtained, the magnetic force of the coil which will start the rotor becomes weaker than the magnetic force between the iron pin and the permanent magnet this time with the result that the start-up incapability is induced. Consequently, there is a problem in that the setting of the pin of the magnetic body and the arrangement thereof are difficult in the method for regulating the rotor to the static position with the pin of the magnetic body.

BRIEF SUMMARY OF THE INVENTION

The present invention has been made to solve such a problem, and an object of the invention is to provide a direct current vibration motor, and an armature structure thereof which can obtain a sufficient vibration and which do not generate the start-up incapability while attempting to further reduce the size thereof and reduce the weight thereof.

According to a first claim of the invention, there is provided a direct current vibration motor comprising:

a stator formed of a permanent magnet magnetized in an axial direction so as to have magnetic poles at a plurality of locations in a circumferential direction, the magnet having a ring-like configuration or being arranged in a ring-like configuration;

a rotor rotatably provided with respect to the stator and having an armature located opposite to the magnetized surface of the permanent magnet eccentrically fixed to the rotation shaft; and current path formation means comprising a commutator and a brush for forming a current path for supplying to the armature current whose polarity is subsequently reversed along with the rotation of the rotor;

wherein the armature is provided with a first coil and a second coil arranged in such a manner that the spatial phase becomes equal to each other, and the current path formation means supplies the current to the first coil and the second coil respectively by making the electric phase different from each other.

According to a sixteenth claim of the invention, there is provided an armature structure of a direct current vibration motor wherein a rotor is rotatably provided with respect to a stator formed of a permanent magnet magnetized in an axial direction so as to have magnetic poles at a plurality of locations in the circumferential direction, the magnet having a ring-like configuration and being arranged in a ring-like configuration, the armature located opposite to the magnetic pole of the surface of the permanent magnet of the rotor is eccentrically fixed to the rotation shaft and a current path for supplying to the armature current whose polarity is subsequently reversed along with the rotation of the rotor is formed of current path formation means comprising the commutator and the brush, the structure comprising a first coil and a second coil arranged so that the spatial phase becomes equal to each other;

wherein current is supplied to the first coil and the second coil respectively by making different the electric phase with the current path formation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
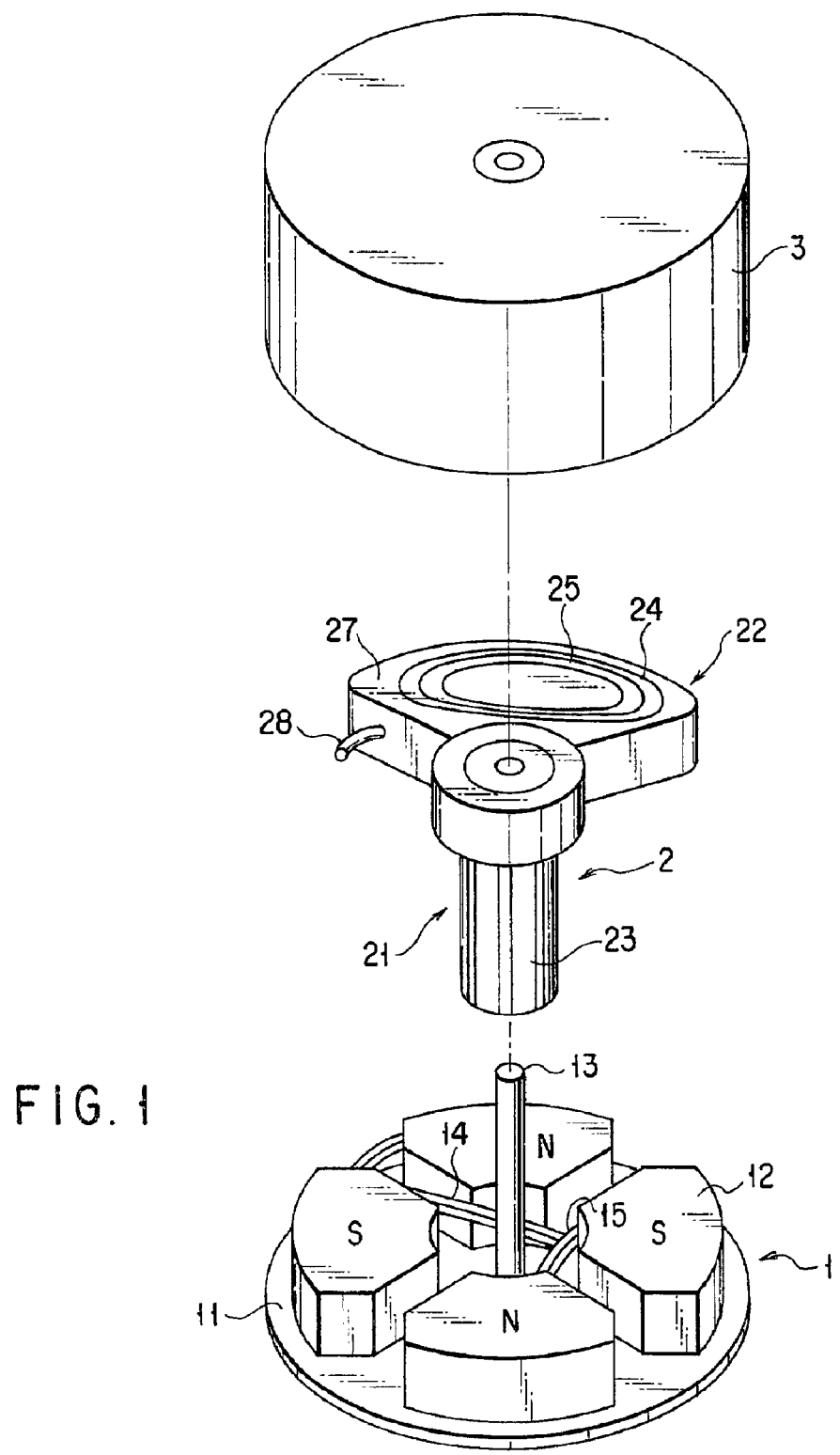
FIG. 1 is an exploded perspective view showing a direct current vibration motor according to a first embodiment of the present invention.

Hereinafter, the present invention will be explained in detail by referring to the embodiments shown in the drawings.

Figure 2:
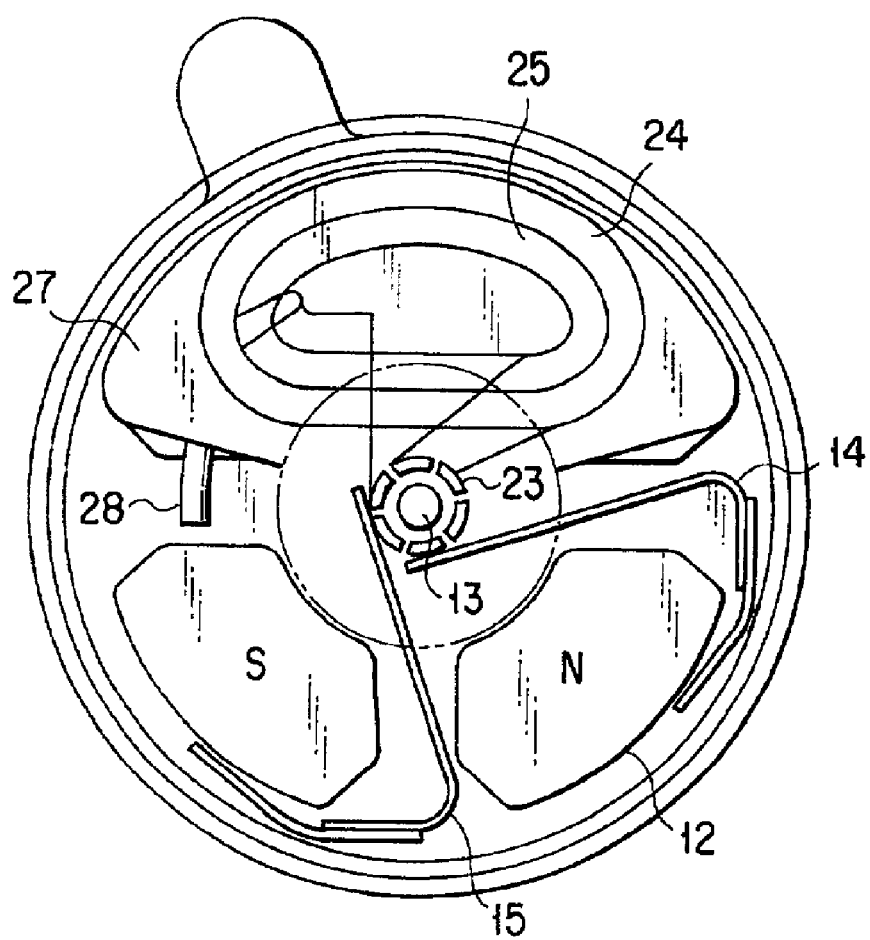
FIG. 2 is a plan view showing the direct current vibration motor according to the first embodiment of the invention.

FIG. 1 is an exploded perspective view showing a flat-type direct current vibration motor according to a first embodiment of the present invention, and FIG. 2 is a plan view thereof.

This direct current vibration motor is constituted in such a manner that the whole motor is formed into a flat cylindrical configuration with a stator 1, a rotor 2 rotatably attached to this stator 1, and a cylindrical cover 3 for sealing the rotor 2. The stator 1 comprises a disc-like plate 11, four permanent magnets 12 arranged in a ring-like configuration and magnetized in an axial direction so that the S pole and the N pole are alternately arranged on this plate 11, a support shaft 13 for supporting the rotor 2 which rises from the center of the plate 11, and two brushes 14 and 15 extending from a gap between adjacent permanent magnets in the circumferential direction toward the central portion of the plate 11 and arranged with the spatial phase of 90°. Furthermore, the rotor 2 comprises a rotation shaft 21 rotatably supported on the support shaft 13, an armature 22 fixed in an eccentric state to one portion of this rotation shaft 21 in the circumferential direction, and a commutator 23 arranged on the outside circumference of the rotation shaft 21 and divided into six in the circumferential direction. The commutator 23 constitutes current path formation means together with the brushes 14 and 15. The armature 22 includes the first coil 24 (an outside coil) and the second coil 25 (an inside coil), a resin frame 27 for integrally supporting these coils 24 and 25, and a pin 28 of the magnetic body for position regulation described later.

Figures 3A, 3B:
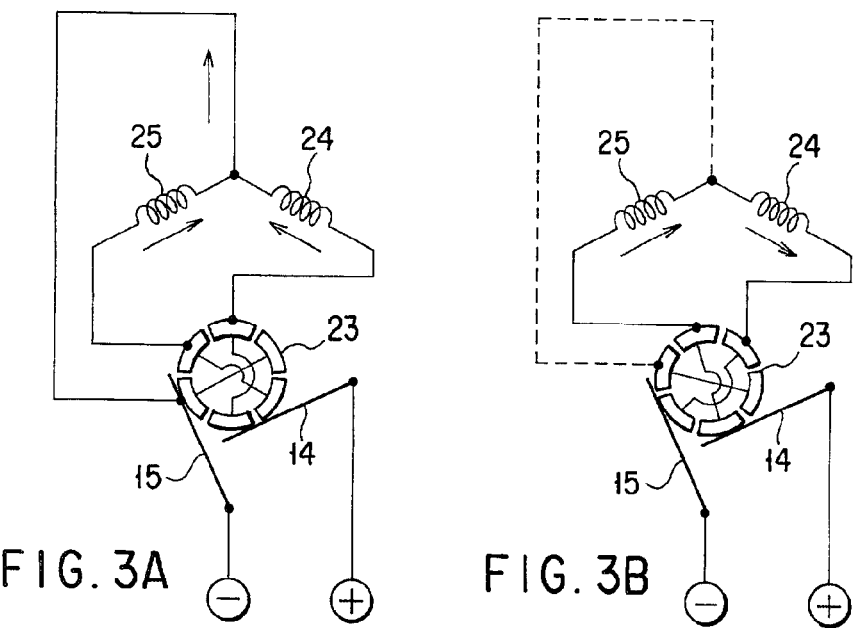
FIGS. 3A and 3B are circuit diagrams showing the direct current vibration motor according to the first embodiment.

For example, as shown in FIG. 3, the first coil 24 and the second coil 25 are star connected. The commutator 23 is constituted in such a manner that divided pieces located opposite to each other out of six divided pieces are connected to each other, and a pair of these divided pieces are connected to one end of the coil 24, one end of the second coil and the common end of the first coil 24 and the second coil 25. Current is supplied to this commutator 23 from the brushes 14 and 15 arranged with a spatial phase difference of 90°. The brushes 14 and 15 are subsequently connected to each one end of the first coil and the second coil 24 and 25 and the common end thereof. Consequently, as shown in FIG. 3A, the rotor 2 is rotated and one of the brushes 14 (or 15) is positioned at a boundary of the divided body of the commutator 23, the current flows in a path from the power source→the brush 14→the commutator 23→the first coil and the second coil 24 and 25→the commutator 23→the brush 15→the grounding. Furthermore, as shown in FIG. 3B, when the rotor 2 is rotated and the brushes 14 and 15 come into contact with each one of the divided body of the commutator 23 respectively, current flows in a path from the power source→the brush 14→the commutator 23→at least one of the first coil and the second coil 24 and 25→the commutator 23→the brush 15→the grounding. In this manner, according to the present invention, even when one of the brushes 14 and 15 is located at the central position of the adjacent divided pieces and the adjacent divided pieces are short circuited with the brushes 14 and 15, the short circuit of the power source short circuit is not generated because of the two coil style.

Figure 4:
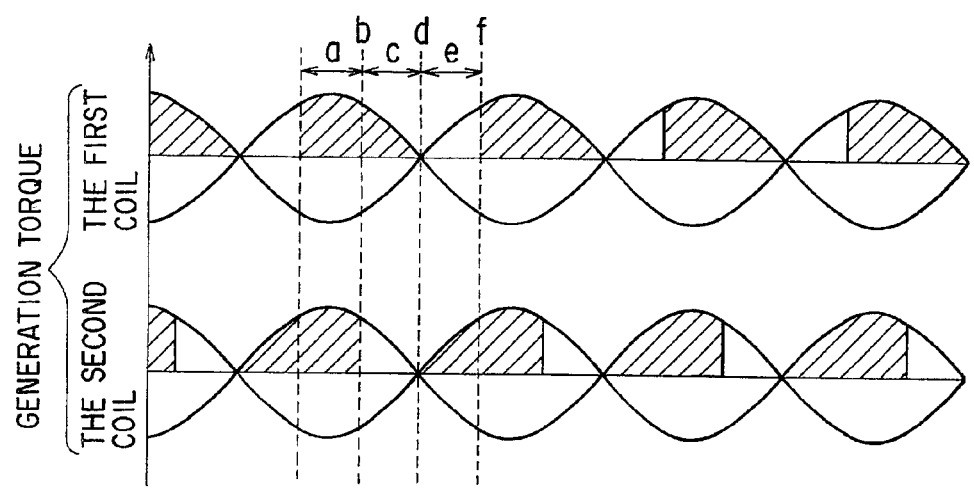
FIG. 4 is a view showing a relationship between a generation torque and time of the direct current vibration motor according to the first embodiment.

FIG. 4 is a torque waveform view for explaining the operation of this direct current motor, and a portion shown with the slanted line in FIG. 4 shows the current supply interval. As shown in FIG. 4, current is supplied to the first coil and the second coil 24 and 25 by making the electric phase different. The generation torque at the time when the current flows through the coil is determined with the position relationship between the coil and the magnetic pole, and the current value. However, when the first coil 24 and the second coil 25 have equal spatial phases, the generation torque in the period in which current is supplied is approximately equal to each other.

Figure 5A:
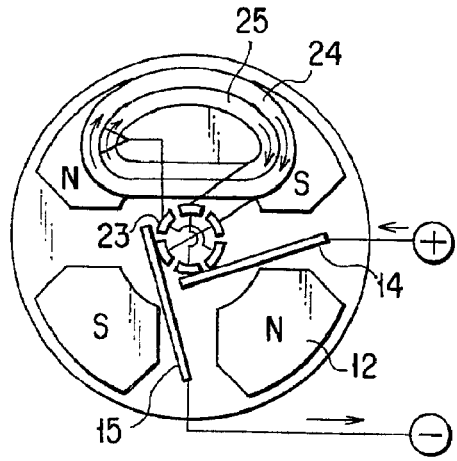
FIGS. 5A through 5F are views for explaining the torque generation principle of the direct current vibration motor respectively.

The position relationship between the rotor 2 denoted by symbols a through f in FIG. 4, and the stator 1 is shown in correspondence to each other as shown in FIGS. 5A through 5F. In an interval a, as shown in FIG. 5A, current flows in the same direction as the first coil 24 and the second coil 25. Since the two coils 24 and 25 pass the position which equally stretches over the two permanent magnets 12, the largest torque is generated both in the coils 24 and 25.

Figure 5B:
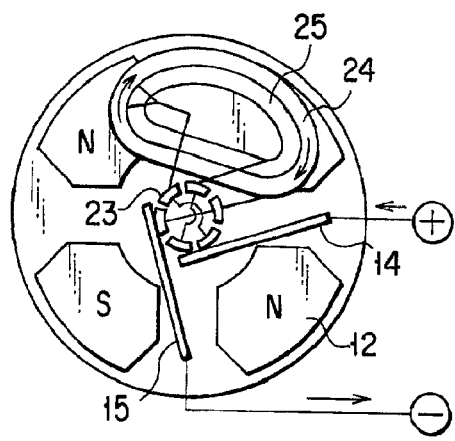
Figure 5C:
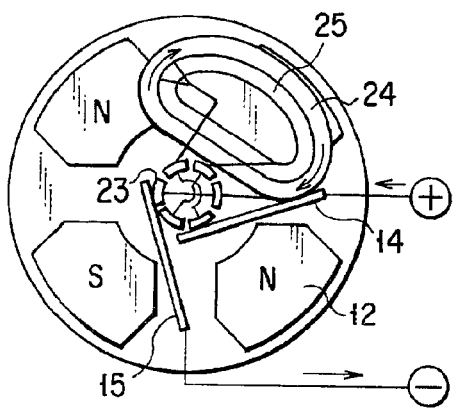

At time b, as shown in FIG. 5B, current continuously flows through the first coil 24, but the current supply to the second coil 25 is severed. Thereafter, in an interval c, as shown in FIG. 5C, current flows through only the first coil 24, and the rotor 2 is rotated with the torque generated only in the first coil 24.

Figure 5D:
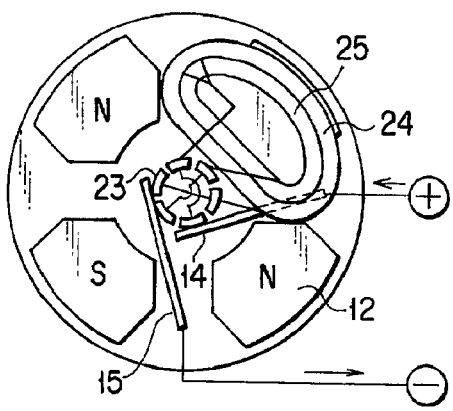
Figure 5E:
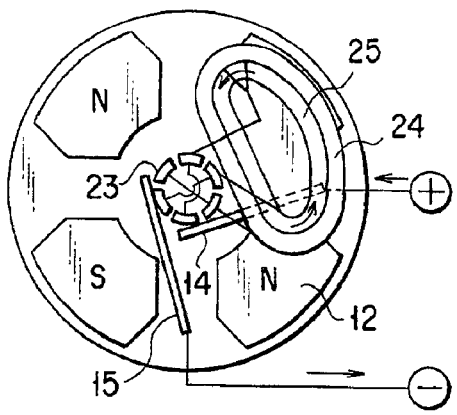
Figure 5F:
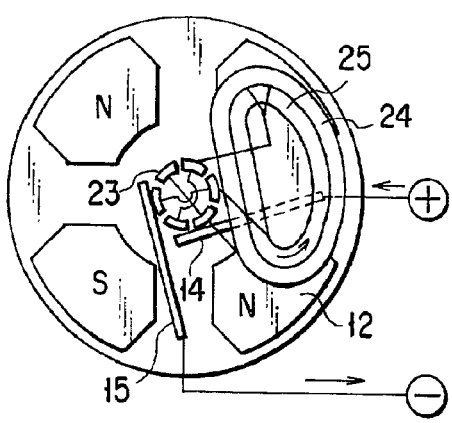

When time d comes, as shown in FIG. 5D, the current supply to the first coil 24 is severed, and the current supply to the second coil 25 is started. However, at the time of the change-over, current is instantly severed. Naturally, in the case where the brushes 14 and 15 are simultaneously connected to the two divided pieces of the commutator 23, current is not instantly severed. In an interval e, as shown in FIG. 5E, current flows through only the second coil 25, and a rotation torque is continuously generated in a relation with the magnetic pole. At time f, current supply to the first coil 24 is started.

In this manner, with this direct current vibration motor, current flows almost continuously through one or more coils even when the armature 22 is set at any angle. When current flows through the first coil and the second coil 24 and 25, a rotation torque is generated in a definite direction in accordance with the Fleming's left hand law. When a third coil is separately provided, and the third coil is arranged coaxially with the first coil and the second coil 24 and 25, current flows through the third coil in a separate direction from the first coil and the second coil 24 and 25 so that the direction of the magnetic force becomes opposite to each other. Thus, it is assumed that the rotation load of the rotor 2 is generated. As seen in the motor of the present embodiment, current flows through the coils 24 and 25 only with respect to the portion of two phases out of three phases. The portion of the other one phase is omitted so that the rotation load described above is not generated, so that a smooth rotation is enabled. When the rotor 2 is rotated, the armature 22 becomes eccentric with respect to the rotation shaft 21 so that the vibration is generated with the centrifugal force.

With this motor, even when the adjacent divided pieces of the commutator 23 are short circuited, the coils 24 and 25 are intervened between the power sources without fail, the short circuit current does not flow. Consequently, the interval between the adjacent divided pieces can be made as short as possible, and the dead point can be set to zero. As a consequence, it is possible to prevent the generation of a phenomenon in which current will not flow at the time of the start-up and the star-up incapability is generated.

However, when the first coil 24 and the second coil 25 are suspended in the state in which the first coil and the second coil 25 are located immediately above the magnetic pole, the armature 22 can be rotated in any direction, so that the rotation direction becomes indefinite. Consequently, in this embodiment, the position regulation pin 28 comprising a magnetic body is provided on the armature 22 so as to project in a circumferential direction. Consequently, since the pin 28 moves by receiving the magnetic force between the permanent magnet 12 and the permanent magnet 12, the position of the armature 22 in the suspended state is positioned at a position where one of the rotation torques is received without fail as shown in FIG. 2. This position is a point d in FIG. 4 and is shown as FIG. 5D.

Incidentally, the present invention is not limited to the above first embodiment. In the first embodiment, the first coil 24 is set as the outside coil, and the second coil 25 is set as the inside coil. For example, as shown in FIG. 6, the first coil 31 and the second coil 32 may be simultaneously formed of a double winding, a rotation torque equal for both coils 31 and 32 is generated, and can be formed in the same manner as the formation of one winding coil so that the manufacturing process can be facilitated.

Figure 6:
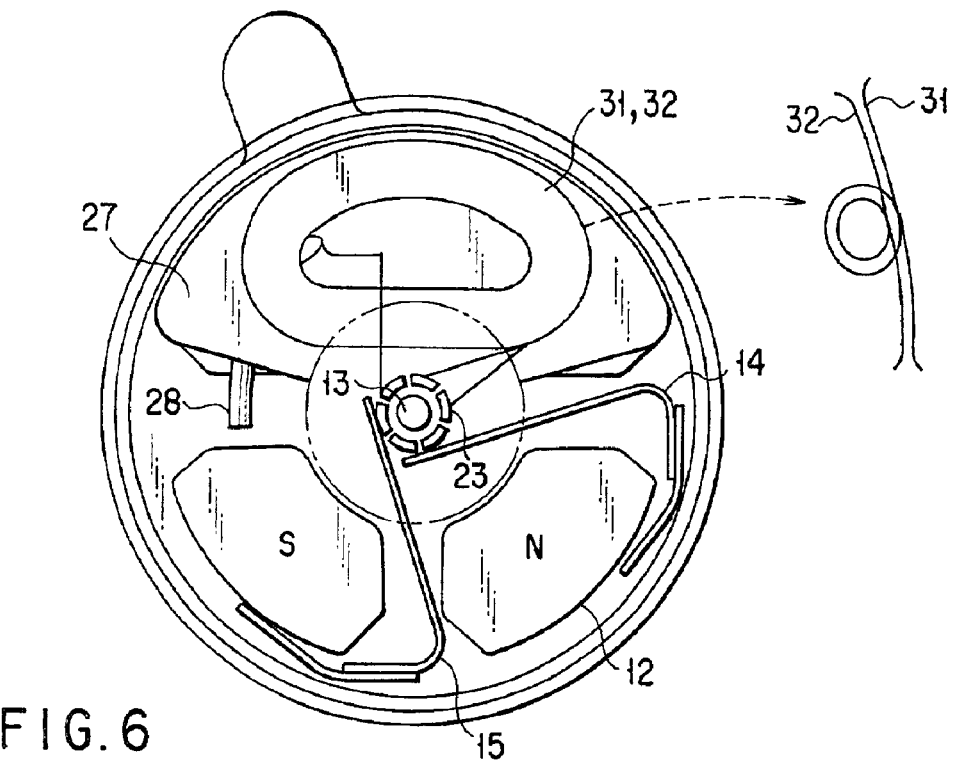
FIG. 6 is a plan view showing the direct current vibration motor according to one variation of the first embodiment of the present invention.
Figure 7:
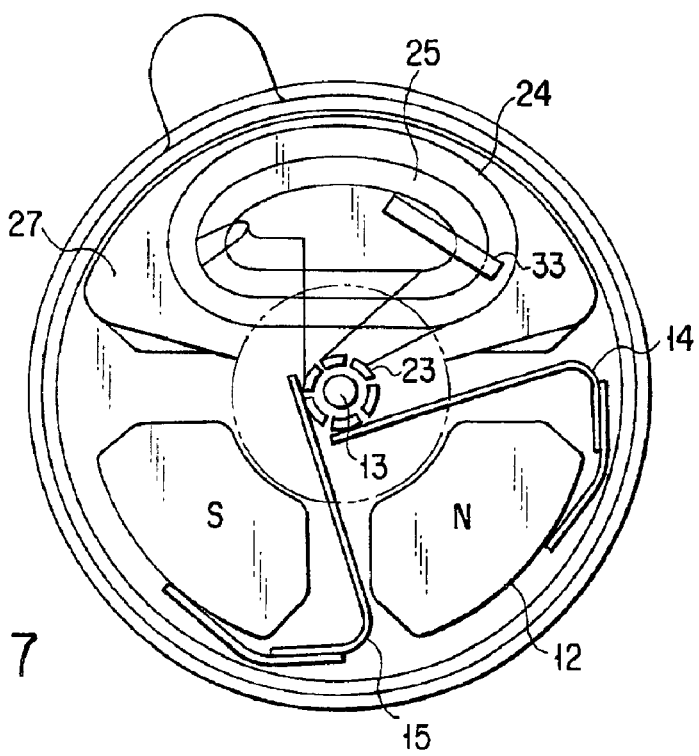
FIG. 7 is a plan view showing the direct current vibration motor according to one variation of the first embodiment of the present invention.

Furthermore, as means having the same function as the pin 28 which serves as a static position regulating means shown in FIG. 6, as shown in FIG. 7, the pin 33 may be arranged with a little inclination along the direction of the magnetic force so that the pin 33 is overlapped with the position of the end of the rotation direction of the first coil and the second coil 24 and 25. By doing so, the armature 22 can be made compact in size. Incidentally, in this case, the angle of the pin 33 may be determined to an appropriate angle in order to obtain a degree of a magnetic absorption force which does not affect the static position and the rotation drive.

As has been described above, according to the first direct current vibration motor and the armature structure of the present invention, the armature comprises the first coil and the second coil arranged in such a manner that the spatial phases are made equal and the armature is constituted in such a manner that current is supplied to at least one of the first coil and the second coil. Thus, the armature can be constituted apparently in the same manner as the one coil motor with the result that the eccentric effect can be heightened. Furthermore, since current always flows through the first coil and the second coil, no electric non-conductive area (the dead point) is provided and a smooth start-up is enabled.

Figure 8:
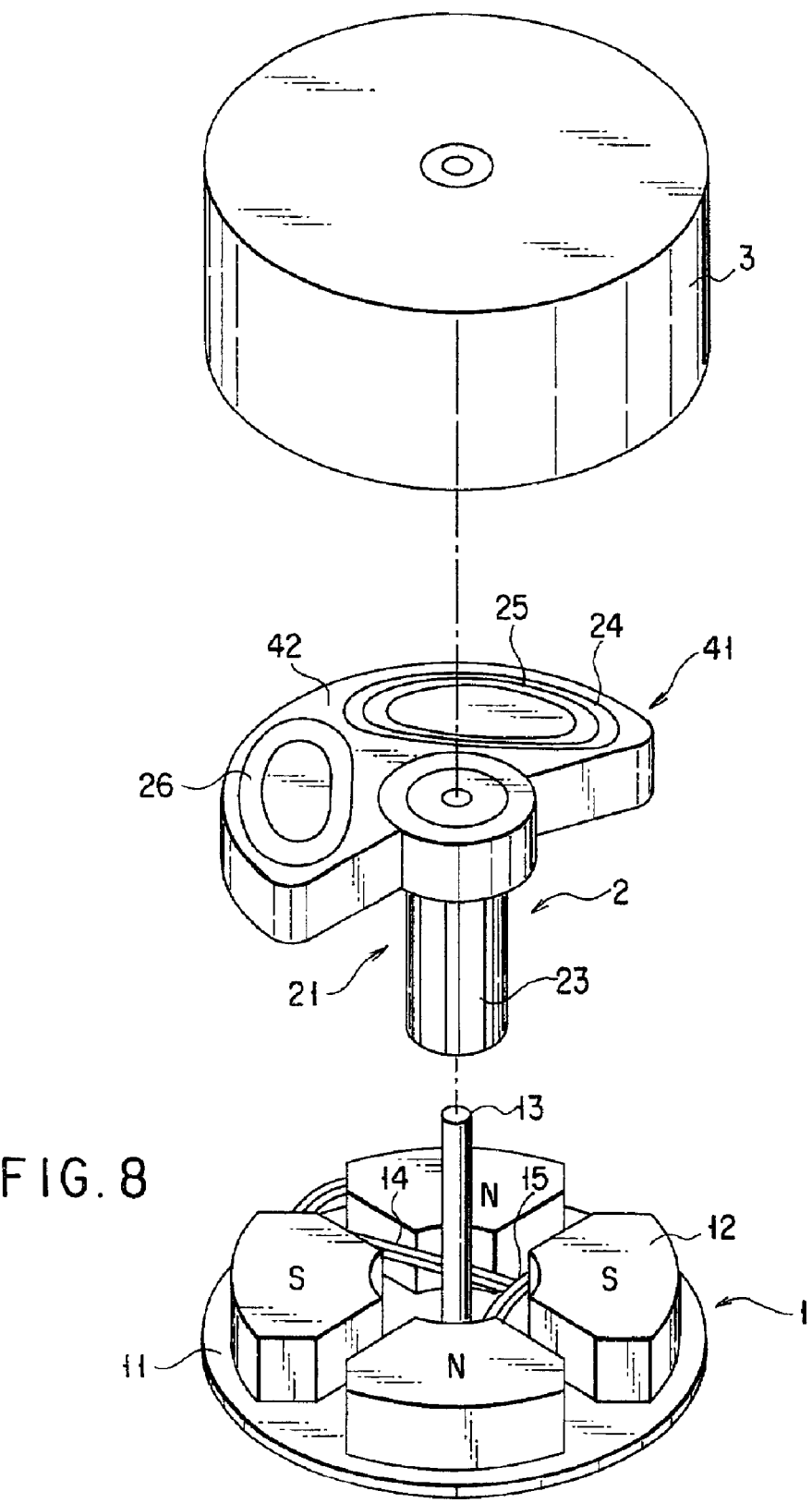
FIG. 8 is an exploded perspective view showing the direct current vibration motor according to a second embodiment of the present invention.
Figure 9:
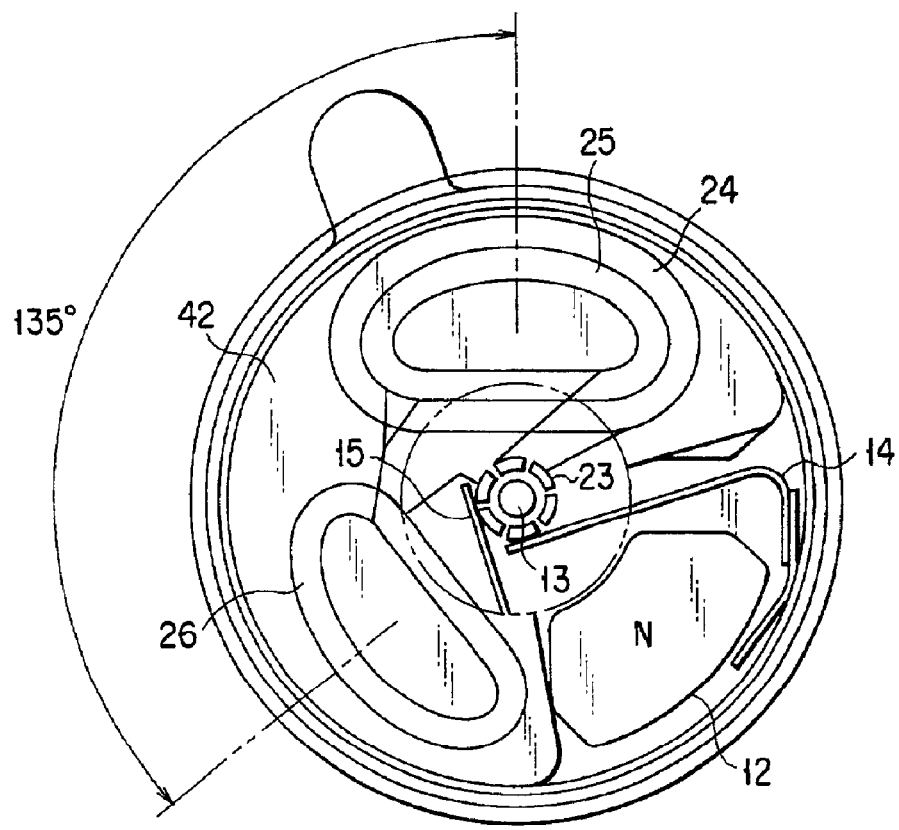
FIG. 9 is a plan view showing the direct current vibration motor according to the second embodiment.

FIG. 8 is an exploded perspective view showing a flat type direct current vibration motor according to the second embodiment of the present invention, and FIG. 9 is a plan view thereof.

This direct current vibration motor is different from the motor shown in FIG. 1 in the structure of the armature 41. The armature 22 includes a first coil 24 (an outside coil) and a second coil 25 (an inside coil) which are coaxially wound, and a third coil (a start-up coil) 26 arranged adjacently to the coils 24 and 25 in the circumferential direction and a resin frame 42 for integrally supporting these coils 24, 25 and 26.

Figure 10A:
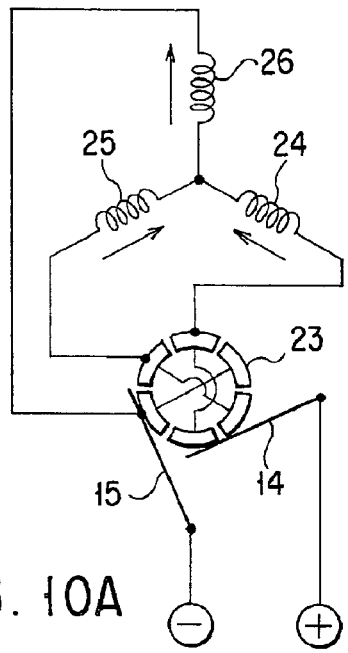
FIGS. 10A and 10B are circuit diagrams showing the direct current vibration motor according to the second embodiment.
Figure 10B:
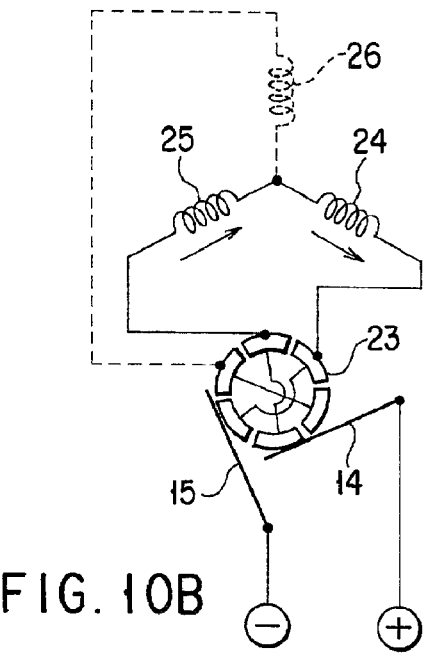

For example, as shown in FIG. 10, the first coil 24, the second coil 25 and the third coil 26 are star connected. The commutator 23 is such that divided pieces located opposite to each other out of the six divided pieces are connected to each other, and a pair of divided pieces connected to each other is connected to one end of the first coil 24, one end of the second coil 25 and one end of the third coil 26 respectively. The other ends of the coils 24, 25 and 26 are commonly connected. Current is supplied from the brushes 14 and 15 arranged in a spatial phase difference of 90° with respect to this commutator 23. The two brushes 14 and 15 are subsequently connected to the commutator 23 connected to each one end of the first to three coils 24, 25 and 26 along with the rotation of the rotor 2. As a consequence, as shown in FIG. 10A, the rotor 2 is rotated and one of the brushes 14 (or 15) is positioned at a boundary of the divided body of the commutator 23, current flows in a path from the power source→the brush 14→the commutator 23→the first through the third coils 24, 25 and 26→the commutator 23→the brush 15→the grounding. Furthermore, as shown in FIG. 10B, when the rotor 2 is rotated and the brushes 14 and 15 come into contact with each one of the divided bodies of the commutator 23, current flows in a path from the power source→the brush 14→the commutator 23→at least two of the first through the third coils 24, 25 and 26→the commutator 23→the brush 15→the grounding. In this manner, according to the present invention, one of the brushes 14 and 15 is located at an intermediate position of the adjacent divided pieces. Thus even when the adjacent two divided pieces of the commutator 23 are short circuited, no power source short circuit is generated because of the three coil style.

Figure 11:
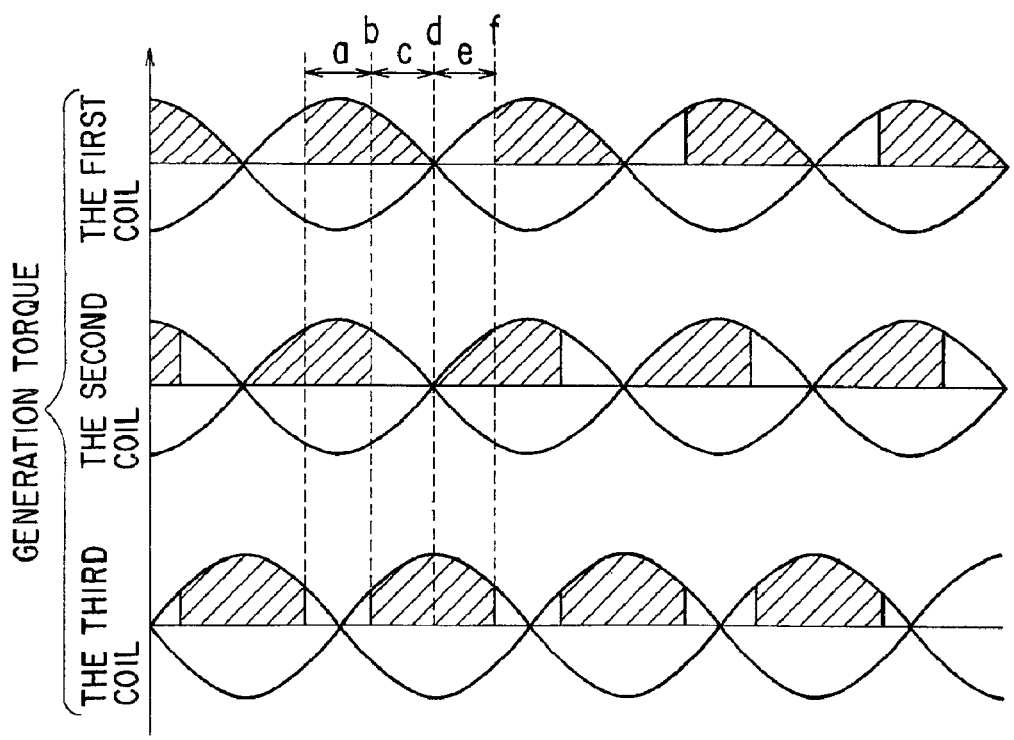
FIG. 11 is a view showing a relationship between a generation torque and time of direct current vibration motor according to the second embodiment.

FIG. 11 is a torque waveform view for explaining an operation of this direct current vibration motor, and a portion shown with the slanted line in FIG. 11 shows the current supply interval. As shown in FIG. 11, current is supplied to the first to the third coils 24, 25 and 26 by, for example, making different the electric phase. The generation torque at the time when current flows through the coil is determined with the position relationship between the coil and the magnetic pole position, and the current value. Since the first coil 24 and the second coil 25 have an equal spatial phases, the generation torque is approximately equal in a period in which current is supplied.

Figure 12A:
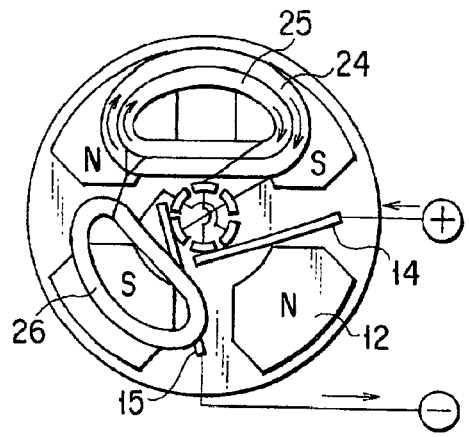
FIGS. 12A through 12F are views for explaining the torque generation principle of the direct current vibration motor respectively.

The position relationship between the rotor 2 and the stator 1 shown in a through f are shown in correspondence to each other in FIGS. 12A through 12F. In the interval a, as shown in FIG. 12A, current flows from the power source→the brush 14→the commutator 23→from the inside to the outside of the second coil 25 (in the clockwise direction)→from the inside to the outside of the first coil 24 (in the clockwise direction)→the commutator 23→the grounding. Since the first coil and the second coil 24 and 25 passes through the position which equally stretches over the two permanent magnets in the state in which the current in the same direction flows, the largest torque is generated both in the first coil and the second coil 24 and 25.

Figure 12B:
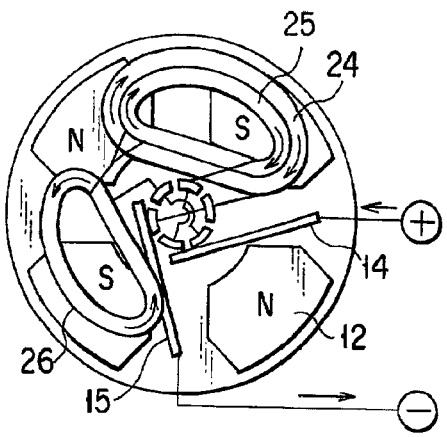
Figure 12C:
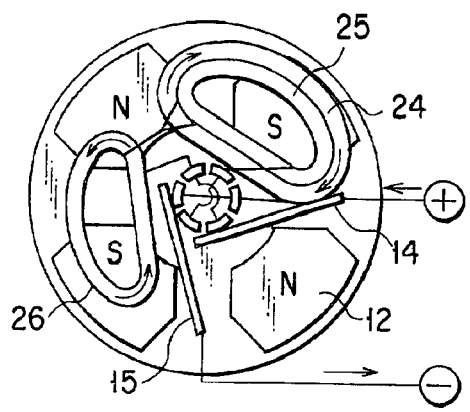

At time b, as shown in FIG. 12B, the brush 14 connected to the power source is located at a boundary between the commutator 23 connected to the inside end of the second coil 25 and the commutator 23 connected to the outside end of the third coil 26 so that current begins to flow from the outside to the inside of the third coil 26 (in an anticlockwise direction). Thus, current instantly flows through the three coils 24 through 26. Immediately after that, current supply to the second coil 25 is severed. After that, in the interval c, as shown in FIG. 12C, current flows through the first coil 24 and the third coil 26, so that the rotor 2 is rotated with the torque generated in the first coil 24 and the third coil 26.

Figure 12D:
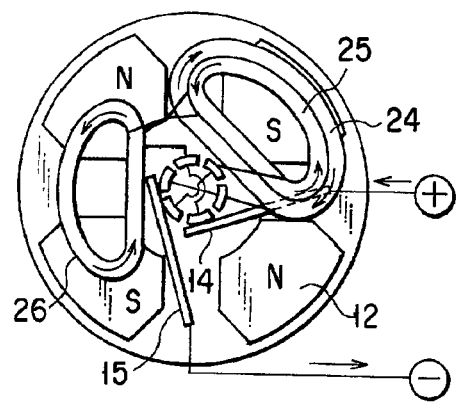
Figure 12E:
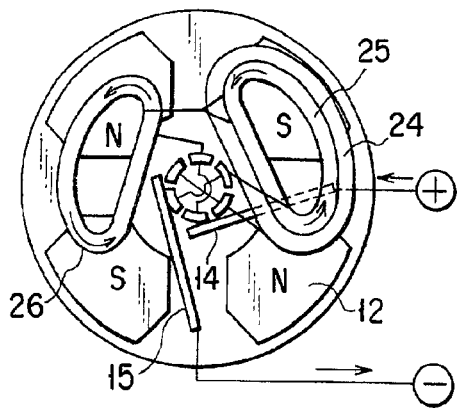
Figure 12F:
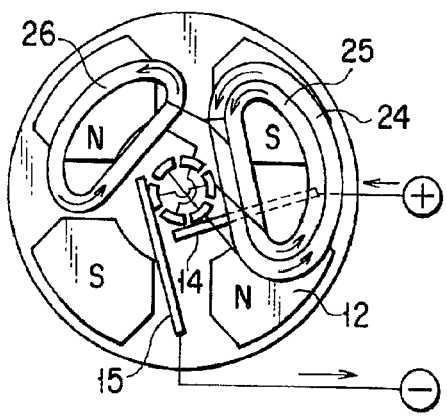

When time d comes, as shown in FIG. 12D, the brush 15 connected to the grounding is positioned at a boundary between the commutator 23 connected to the outside end of the first coil 24 and the commutator 23 connected to the inside end of the second coil 25 with the result that current supply to the second coil 25 is started. However, current flows in a direction opposite to the direction of the current which flows through the first coil 24, so that current is severed which flows through the first coil 24 immediately after that. At this time, the first coil 24 and the second coil 25 are located at a position just opposite to the permanent magnet 12. Torque is not generated with the first coil and the second coil 24 and 25. However, current continues to flow through the third coil 26, so that the largest torque is generated. In the interval e, as shown in FIG. 12E, current flows between the second coil 25 and the third coil 26, so that the rotation torque is continuously generated in a relation with the next magnet. At time f, the current supply to the first coil 24 is started. Immediately after that, the current supply to the third coil 26 is severed. Current continues to flow through the second coil 25.

In this manner, in this direct current motor, even when the armature 41 is set to any angle, current flows almost continuously through two or more coils. When current flows through the first through three coils 24, 25 and 25, a rotation torque in a definite direction is generated in accordance with the Fleming's left hand law. When the third coil 26 is coaxially arranged with the first coil and the second coil 24 and 25, current flows through the third coil 26 in a direction different from the first coil and the second coil 24 and 25. Thus, the direction of the magnetic force becomes opposite, so that the rotation load of the rotor 2 is generated. Furthermore, as shown in FIG. 12D, at a position where the coils 24 and 25 are located opposite to the magnets, no torque is generated in any of the coils. When the motor is suspended at this position, it is assumed that the start-up incapability is generated. However, as seen in this embodiment, only two coils 24 and 25 out of the three coils are coaxially arranged, while the remaining coil is arranged so that the spatial phase becomes different from the counterpart of the former two coils. Thus, no rotation load is generated. Furthermore, even when the rotor 21 is suspended at the position of FIG. 12D, a smooth start-up is enabled with the third coil 26. In order to start up the motor efficiently, as shown in FIG. 9, it is desired that the spatial phase between the first coil and the second coil 24 and 25 and the third coil 26 is set to 135° or more as shown in FIG. 9.

When the rotor 2 is rotated, the armature 41 becomes eccentric with respect to the rotor 21. Consequently a vibration is generated with the centrifugal force. Since the two coils 24 and 25 are arranged by gathering the two coils 24 and 25 at one location in the circumferential direction in this motor, so that a high eccentric effect can be obtained.

Furthermore, since this motor is of three coil type, no short circuit current flows because at least two of the coils 24, 25 and 26 intervene between the power sources without fail even when the adjacent divided pieces of the commutator 23 are short circuited via the brushes 14 and 15. That is, in the case of one coil type, it sometimes happen that a short circuit current flows between the power and the grounding via two phases where no coils happen to be present. Consequently, in the case of one coil type, it is required to widen to some extent an interval between adjacent divided pieces in the circumferential direction so that no circuit is generated between adjacent divided pieces of the commutator 23 with the brushes 14 and 15. Consequently, there arises a dead point where no current flows. With respect to this point, in this embodiment, no short circuit current flows between the power source and the grounding even when the adjacent divided pieces are short circuited. Consequently, the interval between the adjacent divided pieces can be made as short as possible, so that the dead point where no current flows can be set to zero. As a consequence, it is possible to prevent the phenomenon in which no current flows at the time of the start-up and the start-up incapability is generated.

Figure 13:
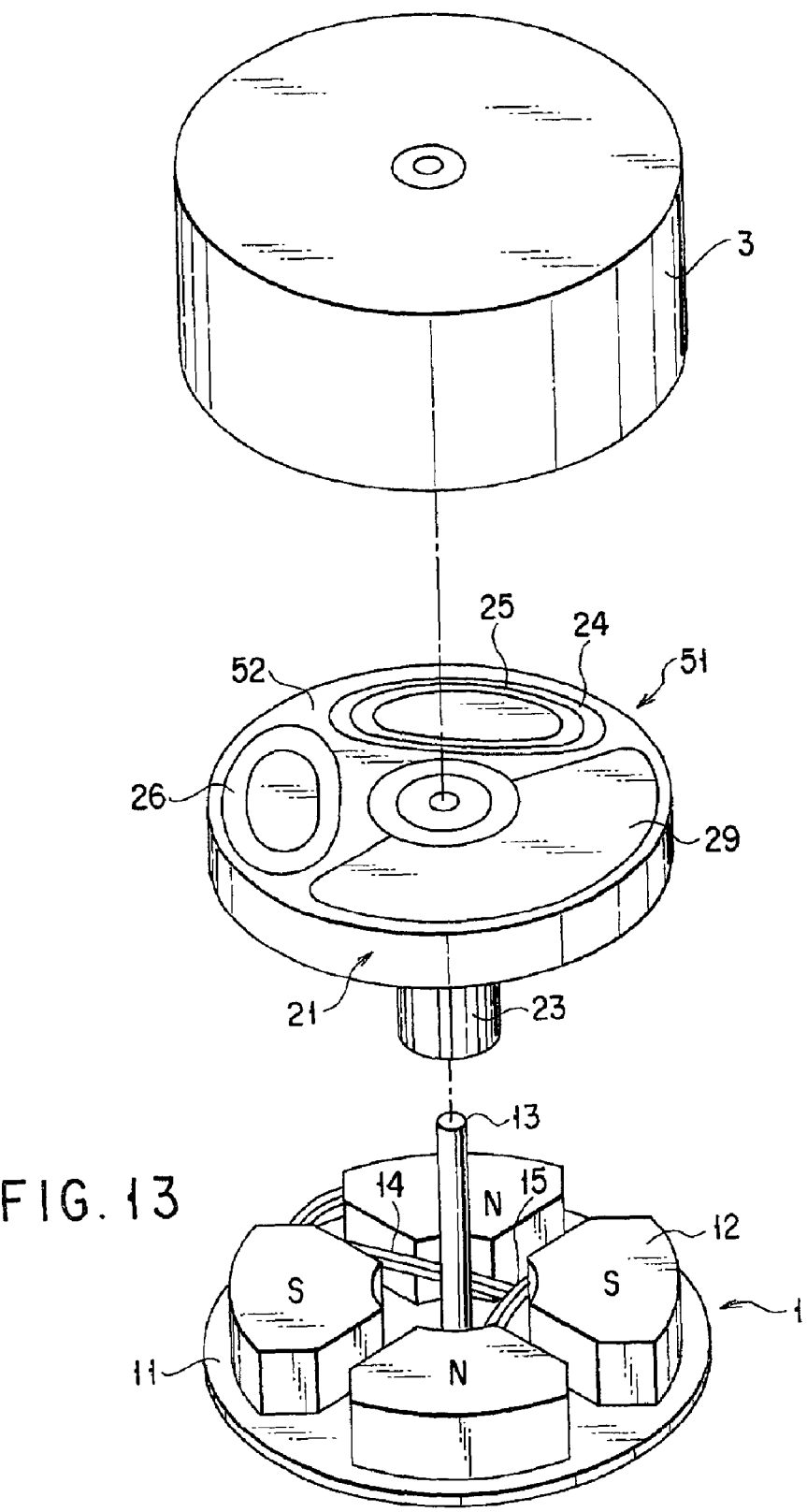
FIG. 13 is an exploded perspective view showing the direct current vibration motor according to a third embodiment of the present invention.

FIG. 13 is an exploded perspective view showing a flat-type direct current vibration motor according to a third embodiment of the present invention. In the third embodiment, the armature 51 is such that a weight 29 is provided on the position adjacent to the first coil 24 and the second coil 25, so that the first coil and the second coil 24 and 25 so that the coils 24, 25 and 26 and the weight 29 are integrated with the resin frame 52. In order to heighten the eccentric effect, it is desired that, for example, the ratio of gravity thereof is high as much as possible (for example, 10 or more). In order to decrease the rotation load resulting from the magnetic force and the vortex current, it is required that the rotor is formed of a non-magnetic and non-conductive body. The size of the weight 29 is set to a level slightly larger than, for example, one permanent magnet 12. When the weight is arranged in the vicinity of the first coil and the second coil 24 and 25, the eccentric effect can be further heightened.

Furthermore, according to the second direct current vibration motor and the armature structure thereof, the armature comprises the first coil and the second coil arranged in such a manner that the spatial phases become equal to each other, and the third coil adjacent to the first coil and the second coil in the rotation direction with the first coil and the second coil, and current is supplied to the first and the third coil so that the electric phase becomes different. The armature can be constituted ostensibly in the same manner as the two coils motor, so that the eccentric effect can be heightened as compared with the three coils motor. Furthermore, according to the present invention, current is supplied to the three coils so that the electric phase becomes different. Thus, no electric non-electrification interval (a dead point) is present, and a secured start-up is constantly started up. Furthermore, according to the present invention, current is supplied to the three coils so that the electric phase becomes different. No electric non-conductive interval (the dead point) is present, so that the secured start-up is enabled at all times. Furthermore, the motor comprises the first coil and the second coil and the third coil adjacent in the rotation direction, so that a space can be secured where the weight can be arranged which can enlarge the vibration in within the circumference. Besides, the countermeasure against the increase in the vibration amount as the vibration motor is favorable as well.

Figure 14:
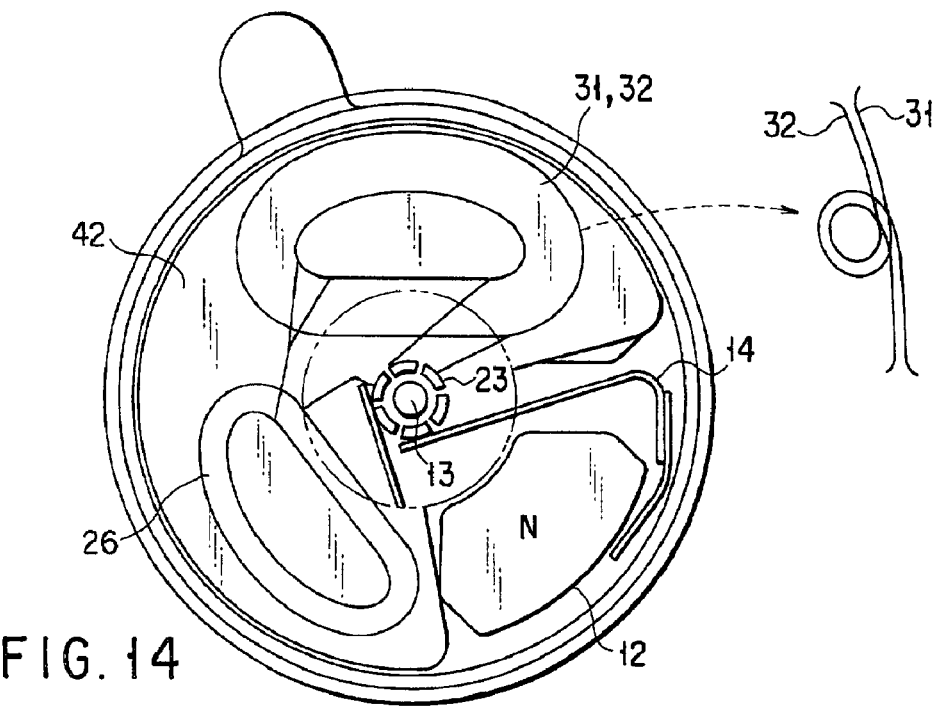
FIG. 14 is a plan view showing a direct current vibration motor according to a variation of the second embodiment.
Figure 15:
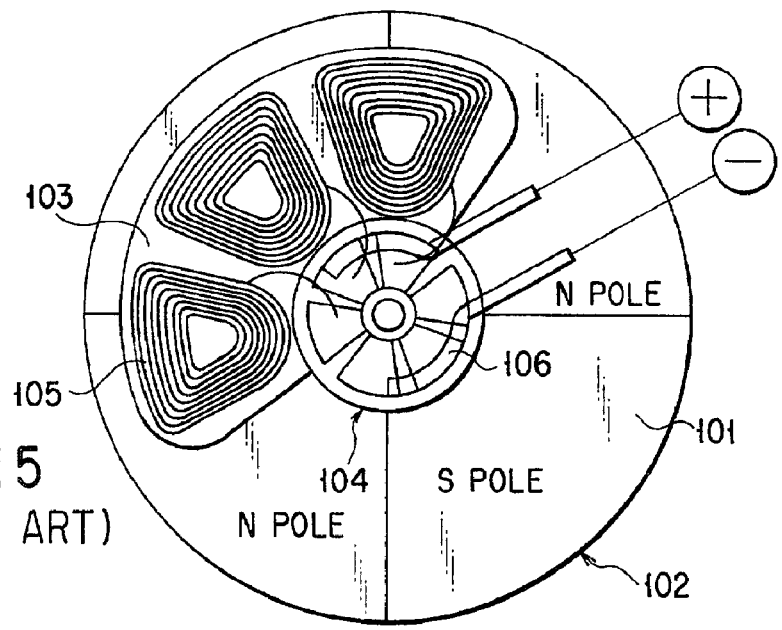
FIG. 15 is a plan view showing a conventional three coil type direct current vibration motor.
Figure 16:
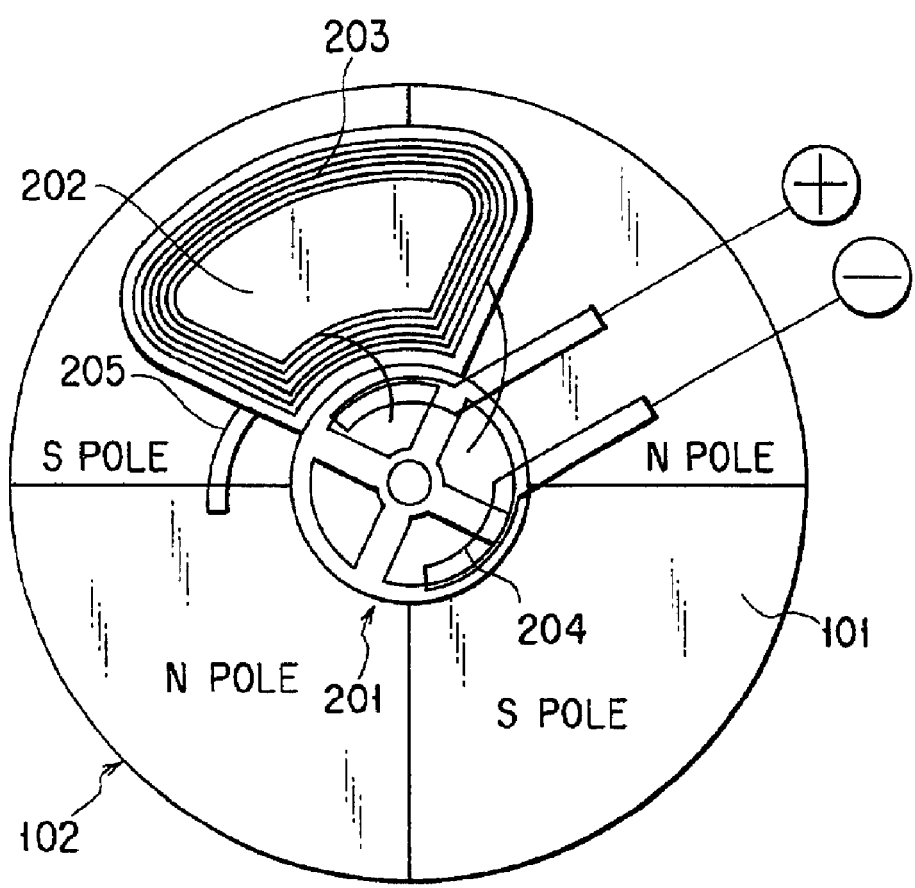
FIG. 16 is a plan view showing a conventional one coil type direct current vibration motor.

Incidentally, the present invention is not limited to the above embodiment. In the above embodiment, the first coil 24 is formed of an outside winding, and the second winding is formed of an inside winding. For example, as shown in FIG. 14, the first coil and the second coil 31 and 32 may be simultaneously formed of the double winding. When the first coil and the second coil 31 and 31 are formed of the double winding in this manner, a rotation torque equal to both coils 31 and 32 is generated, and can be formed in the same manner as the formation of one winding coil with the result that the manufacturing process can be simplified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A direct current vibration motor comprising:
   a stator formed of a permanent magnet magnetized in an axial direction so as to have magnetic poles at a plurality of locations in a circumferential direction, the magnet having a ring-like configuration or being arranged in a ring-like configuration;
   a rotor rotatably provided with respect to the stator and having an armature located opposite to the magnetized surface of the permanent magnet eccentrically fixed to the rotation shaft; and
   current path formation means comprising a commutator and a brush for forming a current path for supplying to the armature current whose polarity is subsequently reversed along with the rotation of the rotor;
   wherein the armature is provided with a first coil and a separate second coil arranged in such a manner that the spatial phase becomes equal to each other, and the current path formation means supplies the current to the first coil and the second coil respectively by making the electric phase different from each other; and
   wherein the second coil is coaxially wound around the inside of the first coil.

2. The direct current vibration motor according to claim 1, wherein the first coil and the second coil are formed of two-lines coils.

3. The direct current vibration motor according to claim 1, wherein a position regulation pin comprising a magnetic body is further provided on the armature in the circumferential direction.

4. The direct current vibration motor according to claim 1, wherein a pin is further provided so as to overlap the first coil and the second coil at the position of the end of the rotation direction and so as to follow the direction of the magnetic force.

5. The direct current vibration motor according to claim 1, wherein the stator has four magnetic poles in a circumferential direction, the first coil and the second coils are coaxially wound in a size covering one to two magnetic poles out of four magnetic poles of the stator, and at the same time, one end of the coils are commonly connected, the commutator is attached on the rotor, and is divided into six in the rotation direction of the rotor, and, at the same time, the divided bodies located opposite to each other are commonly connected and each pair of the divided bodies are connected respectively to each one end of the first coil and the second coil and the common ends thereof, and the brushes are attached on the stator and comprise two brushes respectively connected with a spatial phase difference of 90° to the commutator.

6. The direct current vibration motor according to claim 5, wherein the first coil and the second coil are simultaneously formed of two lines coils at the same time.

7. The direct current vibration motor according to claim 5, wherein a position regulation pin comprising a magnetic body is provided on the armature in the circumferential direction.

8. The direct current vibration motor according to claim 5, wherein a pin is further provided so as to overlap the first coil and the second coil at the position of the end of the rotation direction and so as to follow the direction of the magnetic force.

9. The direct current vibration motor according to claim 1, wherein the armature is further provided with a third coil arranged adjacent to the first coil and the second coil in the rotation direction.

10. The direct current vibration motor according to claim 9, wherein the first coil and the second coil are simultaneously formed of two-lines coils.

11. The direct current vibration motor according to claim 9, wherein a weight is further provided which is arranged adjacent to the first coil and the second coil in the rotation direction.

12. The direct current vibration motor according to claim 11, wherein the first coil through the third coil and the weight are integrally fixed with the resin frame.

13. The direct current vibration motor according to claim 9, wherein the stator has four magnetic poles in the circumferential direction;

the first coil and the second coil are coaxially wound in a size covering one through two magnetic poles out of four magnetic poles of the stator, and the third coil is arranged approximately in the center of the other two magnetic poles when the first coil and the second coil are located just opposite to one magnetic pole;

the commutator is attached on the rotor and is divided into six in the rotation direction of the rotor, and at the same time, each of the divided bodies located opposite to each other are commonly connected, and a pair of the divided bodies are connected to each of the other ends of the first through the third coil; and the brushes are attached on the stator and are connected to the commutator with a spatial phase difference of 90°.

14. The direct current vibration motor according to claim 13, wherein the first coil and the second coil are simultaneously formed of two-lines coils.

15. The direct current vibration motor according to claim 13, wherein a weight is further provided which is arranged adjacent to the first coil and the second coil in the rotation direction.

16. The direct current vibration motor according to claim 15, wherein the first through the third coil and the weight are integrally fixed with resin frame.

17. The direct current vibration motor according to claim 13, wherein the first coil and the second coil and the third coil are arranged with a spatial phase difference of approximately 135° in the rotation direction.

18. An armature structure of a direct current vibration motor wherein a rotor is rotatably provided with respect to a stator formed of a permanent magnet magnetized in an axial direction so as to have magnetic poles at a plurality of locations in the circumferential direction, the magnet having a ring-like configuration and being arranged in a ring-like configuration, the armature located opposite to the magnetic pole of the surface of the permanent magnet of the rotor is eccentrically fixed to the rotation shaft and a current path for supplying to the armature current whose polarity is subsequently reversed along with the rotation of the rotor is formed of current path formation means comprising the commutator and the brush, the structure comprising a first coil and a separate second coil arranged so that the spatial phase becomes equal to each other;

wherein current is supplied to the first coil and the second coil respectively by making different the electric phase with the current path formation means; and wherein the second coil is coaxially wound around the inside of the first coil.

19. The direct current vibration motor according to claim 13, wherein a third coil is further provided adjacent to the first coil and the second coil in the rotation direction;

wherein current is supplied to the first coil through the third coil with the current path formation means by making the electric phase different.

* * * * *